(12) United States Patent
Kawaguchi et al.

(10) Patent No.: US 10,806,167 B2
(45) Date of Patent: Oct. 20, 2020

(54) GELLING COMPOSITION

(71) Applicant: NUTRI CO., LTD., Yokkaichi-shi, Mie (JP)

(72) Inventors: Susumu Kawaguchi, Yokkaichi (JP); Yohei Taniyama, Yokkaichi (JP); Shouta Uwamori, Yokkaichi (JP)

(73) Assignee: Nutri Co., Ltd., Yokkaichi-shi, Mie (JP)

( * ) Notice: Subject to any disclaimer, the term of this patent is extended or adjusted under 35 U.S.C. 154(b) by 116 days.

(21) Appl. No.: 15/560,970

(22) PCT Filed: Mar. 17, 2016

(86) PCT No.: PCT/JP2016/058532
§ 371 (c)(1),
(2) Date: Sep. 22, 2017

(87) PCT Pub. No.: WO2016/152729
PCT Pub. Date: Sep. 29, 2016

(65) Prior Publication Data
US 2018/0077961 A1 Mar. 22, 2018

(30) Foreign Application Priority Data
Mar. 24, 2015 (JP) ................................. 2015-060309

(51) Int. Cl.
| | | |
|---|---|---|
| *A23L 29/20* | (2016.01) | |
| *A23L 33/00* | (2016.01) | |
| *A23L 29/212* | (2016.01) | |
| *A23L 29/256* | (2016.01) | |
| *A23L 29/269* | (2016.01) | |
| *A23L 29/238* | (2016.01) | |
| *A23L 33/16* | (2016.01) | |

(52) U.S. Cl.
CPC ............. *A23L 29/20* (2016.08); *A23L 29/212* (2016.08); *A23L 29/238* (2016.08); *A23L 29/256* (2016.08); *A23L 29/272* (2016.08); *A23L 33/16* (2016.08); *A23L 33/40* (2016.08); *A23V 2002/00* (2013.01)

(58) Field of Classification Search
CPC ...... A23L 29/20; A23L 29/212; A23L 29/238; A23L 29/256; A23L 29/272; A23L 33/16; A23L 33/40
USPC ........................................................ 426/573
See application file for complete search history.

(56) References Cited

U.S. PATENT DOCUMENTS

| | | |
|---|---|---|
| 2008/0107789 A1 | 5/2008 | Akimoto |
| 2011/0177176 A1* | 7/2011 | Sridhar .................. A23L 29/231 424/728 |
| 2013/0171317 A1 | 7/2013 | Chang et al. |

FOREIGN PATENT DOCUMENTS

| | | |
|---|---|---|
| EP | 1431313 A1 | 6/2004 |
| GB | 2261805 A | 6/1993 |
| JP | S64-060338 A | 3/1989 |
| JP | H10-215797 A | 8/1998 |
| JP | 2000-201633 A | 7/2000 |
| JP | 2004-194661 A | 7/2004 |
| JP | 2004-229514 A | 8/2004 |
| JP | 2004-283073 A | 10/2004 |
| JP | 2007-236322 A | 9/2007 |
| JP | 2008-118988 A | 5/2008 |
| JP | 2009-247286 A | 10/2009 |
| JP | 2009-291175 A | 12/2009 |
| JP | 2011-254798 A | 12/2011 |
| JP | 2012-044960 A | 3/2012 |
| JP | 2013-138670 A | 7/2013 |
| JP | 2013-169207 A | 9/2013 |
| JP | 2014-039482 A | 3/2014 |
| JP | 2015-000870 A | 1/2015 |
| JP | 2015-019658 A | 2/2015 |
| WO | WO 96/13177 A1 | 5/1996 |
| WO | WO 2014/020717 A1 | 2/2014 |

OTHER PUBLICATIONS

Hirano et al., "Cooking Properties of Thermostable Vegetable Gel with Gellan Gum", Journal of Cookery Science of Japan, vol. 47, No. 1, 2014, pp. 9-16.
Hirano et al., "Study on the Preparation and Cooking Properties of Thermostable Vegetable Gel", Journal of the Japanese Society for Food Science and Technology, vol. 60, No. 8, 2013, pp. 418-424.
International Search Report (PCT/ISA/210) issued in PCT/JP2016/058532, dated Jun. 21, 2016.
Kubo et al., "Effects of Calcium Concentration and Cooling Rate on Gelation of Gellan Gum", Journal of the Japanese Society for Food Science and Technology, vol. 59, No. 11, 2012, pp. 545-555.
Written Opinion (PCT/ISA/237) issued in PCT/JP2016/058532, dated Jun. 21, 2016.
Extended European Search Report for European Application No. 16768632.8, dated Aug. 1, 2018.
Kasapis et al., "Structural Aspects and Phase Behaviour in Decylated and High Acyl Gellan Systems," Carbohydrate Polymers, vol. 38, No. 2, Feb. 1999, pp. 145-154.

(Continued)

*Primary Examiner* — Jyoti Chawla
(74) *Attorney, Agent, or Firm* — Morgan, Lewis & Bockius LLP

(57) ABSTRACT

The present invention provides a gelling composition for preparing a gelatinous food which do not dissolve even when reheated (e.g., dysphagia diet).

The present invention provides a gelling composition for preparing a gelatinous food which retains its original shape even when reheated, wherein the gelling composition comprises a water-soluble polymer capable of forming a thermo-irreversible gel. Also provided is a method of gelling a food and enhancing the shape-retaining property of the food against reheating by using the above-described gelling composition, as well as a method of preparing a gelatinous food which retains its original shape even when reheated by using the above-described gelling composition.

23 Claims, 2 Drawing Sheets

(56) References Cited

OTHER PUBLICATIONS

English translation of International Preliminary Report on Patentability and Written Opinion dated Oct. 5, 2017, in PCT International Application No. PCT/JP2016/058532.
Office Action issued in corresponding Japanese Patent Application No. 2017-508295 dated Oct. 29, 2019.
Submission of Publications, JP 2017-508295, issued on Apr. 6, 2020.
Ogoshi et al, Thickness Adjusting Agent Handbook, Takashi Matsubayashi, 2012.

* cited by examiner

GELLING COMPOSITION

TECHNICAL FIELD

The present invention relates to a gelling composition. More specifically, the present invention relates to a gelling composition for preparing a gelatinous food which retains its original shape even when reheated after preparation of food.

BACKGROUND ART

Foods provided by mass feeding facilities such as hospitals or nursing facilities must comply with a control manual for preventing food poisoning as established by Ministry of Health, Labour and Welfare (Hygienic Control Manual for Large-Scale Cooking Facilities, Notification 1022 No. 10 issued on Oct. 22, 2013 by the Director of Dept. of Food Safety, Pharmaceutical and Food Safety Bureau, Ministry of Health, Labour and Welfare; Non-Patent Document No. 1).

In such facilities, dysphagia diets prepared with a gelling composition (generally called "jelly food") are frequently served to elderly or diseased individuals with reduced chewing function (i.e., individuals having difficulty in swallowing). However, dysphagia diets prepared with a conventional gelling composition have had a problem in that when reheated under the conditions stipulated in the Hygienic Control Manual for Large-Scale Cooking Facilities, they dissolve and cannot retain their original shapes.

PRIOR ART LITERATURE

Non-Patent Documents

Non-Patent Document No. 1: Hygienic Control Manual for Large-Scale Cooking Facilities, Notification 1022 No. 10 issued on Oct. 22, 2013 by the Director of Dept. of Food Safety, Pharmaceutical and Food Safety Bureau, Ministry of Health, Labour and Welfare

DISCLOSURE OF THE INVENTION

Problem for Solution by the Invention

It is an object of the present invention to provide a gelling composition for preparing a gelatinous food which does not dissolve when reheated (e.g., dysphagia diet).

Means to Solve the Problem

It is known that deacylated gellan gum, alginic acid, and so on have thermo-irreversibility. By using this property, the present inventors have succeeded in preparing a gelling composition which is capable of producing a dysphagia diet that does not dissolve when reheated. Thus, the present invention has been achieved. Gelatinous foods prepared with the gelling composition of the present invention are capable of retaining their original shapes even after reheating treatment in accordance with the Hygienic Control Manual for Large-Scale Cooking Facilities. Therefore, the gelling composition of the present invention is suitable for preparing those gelatinous dysphagia diets which are to be served at hospitals or nursing facilities to elderly or diseased individuals with reduced chewing function (i.e., individuals having difficulty in swallowing).

A summary of the present invention is as described below.
(1) A gelling composition for preparing a gelatinous food which retains its original shape even when reheated, wherein the gelling composition comprises a water-soluble polymer capable of forming a thermo-irreversible gel.
(2) The gelling composition of (1) above, wherein the reheating is carried out with the temperature at the center of the food being held at 75° C. or more for a heating period of one minute or longer, or under conditions equivalent thereto or more severe.
(3) The gelling composition of (1) or (2) above, which comprises at least one water-soluble polymer selected from the group consisting of deacylated gellan gum and alginic acids, and further comprises a calcium salt.
(4) The gelling composition of any one of (1) to (3) above, which further comprises a dispersant.
(5) The gelling composition of (4) above, wherein the dispersant is dextrin.
(6) The gelling composition of any one of (1) to (5) above, which further comprises a pH regulator and/or a gelation retardant.
(7) The gelling composition of (6) above, wherein the pH regulator and/or the gelation retardant is trisodium citrate.
(8) A method of gelling a food and enhancing the shape-retaining property of the food against reheating, wherein the method comprises allowing the food to contain the gelling composition of any one of (1) to (7) above.
(9) A method of preparing a gelatinous food which retains its original shape even when reheated, wherein the method comprises allowing the food to contain the gelling composition of any one of (1) to (7) above.

Effect of the Invention

According to the present invention, it has become possible to prepare a gelatinous food which retains its original shape even when reheated after preparation of food.

The present specification encompasses the contents disclosed in the specification and/or the drawings of Japanese Patent Application No. 2015-60309 based on which the present patent application claims priority.

BEST MODES FOR CARRYING OUT THE INVENTION

Figure 1:
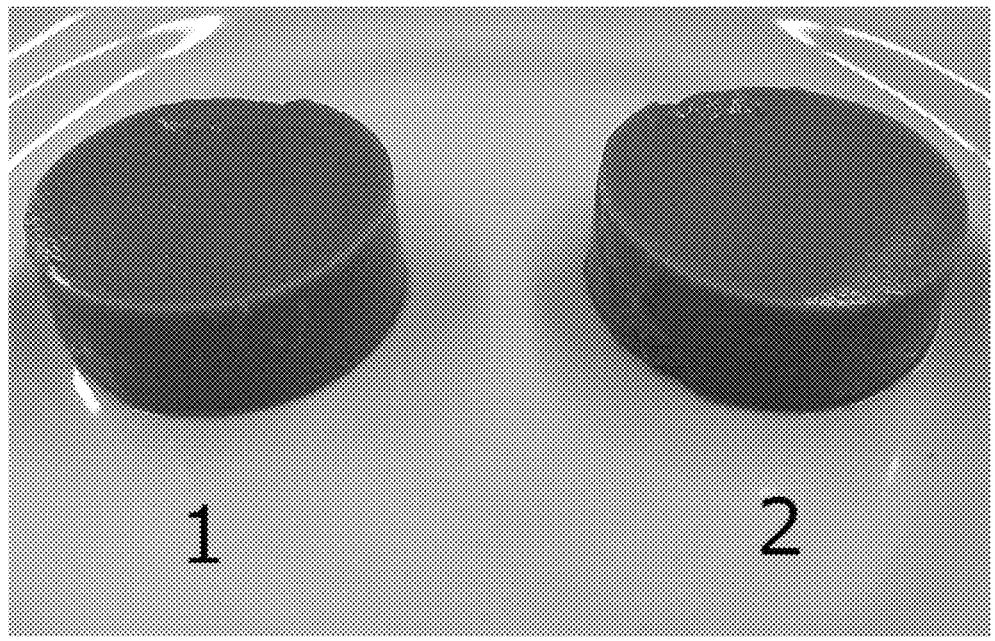
FIG. 1. The states of foods before reheating are shown (1: food using the gelling composition prepared in Example 1; and 2: food using the gelling composition prepared in Comparative Example 1).

Hereinbelow, embodiments of the present invention will be described more specifically.

The present invention provides a gelling composition for preparing a gelatinous food which retains its original shape even when reheated, the gelling composition comprising a water-soluble polymer capable of forming a thermo-irreversible gel.

Reheating may be carried out with the temperature at the center of the food being held at 75° C. or more for a heating period of one minute or longer, or under conditions equivalent thereto or more severe.

For example, in Cook-Chill or New Cook-Chill system (a food preparation system in which cooked dishes are chilled rapidly and served after reheating at mealtime), a prepared food is reheated in a steam convection oven or a reheating cart (heating with 100° C. or hotter air). The gelling composition of the present invention is capable of providing a gelatinous food which retains its original shape even under the reheating conditions used in Cook-Chill or New Cook-Chill.

The gelling composition of the present invention may comprise deacylated gellan gum as a water-soluble polymer, with a calcium salt being preferably contained as an additional component. A gel formed upon reaction of deacylated gellan gum and a calcium salt has thermo-irreversibility. Deacylated gellan gum is a polysaccharide produced extracellularly by a microorganism *Sphingomonas elodea* occurring in waterweeds. It differs from the native-type gellan gum in that an acetyl group and a glyceryl group present in 1→3 glucose have been removed. The gel has such characteristics that it is hard, fragile, thermo-stable and acid tolerant. The calcium salt may be of any type that causes a gelling reaction with deacylated gellan gum and may be exemplified by calcium sulfate, calcium chloride, calcium acetate, calcium lactate, calcium gluconate, calcium primary phosphate, calcium secondary phosphate, calcium tertiary phosphate, calcium malate, calcium hydroxide, calcium citrate, calcium carbonate and the like. Among these, calcium lactate is preferable.

Alternatively, the gelling composition of the present invention may comprise an alginic acid as a water-soluble polymer and may further comprise a calcium salt. A gel formed upon reaction of an alginic acid and a calcium salt has thermo-irreversibility. Alginic acids may be prepared by extraction from seaweeds. Commercially available alginic acids may include alginic acid, sodium alginate, potassium alginate, ammonium alginate, calcium alginate, alginates and the like. The calcium salt may be of any that causes a gelling reaction with alginic acids and may be exemplified by calcium sulfate, calcium chloride, calcium acetate, calcium lactate, calcium gluconate, calcium primary phosphate, calcium secondary phosphate, calcium tertiary phosphate, calcium malate, calcium hydroxide, calcium citrate, calcium carbonate and the like. Among these, calcium lactate is preferable.

Further, the gelling composition of the present invention may comprise curdlan, pectin, CMC or the like as a water-soluble polymer capable of forming a thermo-irreversible gel.

The gelling composition of the present invention may preferably contain a dispersant as an additional component.

The dispersant is added to assist the degradability and solubility of particles. By adding the dispersant, it is possible to inhibit the formation of aggregates due to adhesion of particles, improve the dispersibility in water of the water-soluble polymer capable of forming a thermo-irreversible gel, and enhance the solubility through this improvement of dispersibility. The dispersant is preferably water-soluble. Specific examples of water-soluble dispersants include, but not limited to, maltodextrin, powder candy, dextrin (preferably, porous dextrin), lactose, starch, powdered sugar and granulated sugar. The dispersant is preferably in the form of porous particles in order to enhance the solubility. To form porous particles, the flow coating method, the drum dryer method or the like may be used. Those particles granulated by the drum dryer method have surfaces covered with horn-like or wart-like small projections, which are capable of delaying the wetting of the surfaces of particles as they are dissolving in water. This provides a more effective way to prevent the formation of aggregates before the particles are dispersed. The particle size of the dispersant may, for example, be adjusted to 250-1000 μm in diameter.

The gelling composition of the present invention may further comprise a pH regulator and/or a gelation retardant.

The pH regulator and/or gelation retardant is capable of adjusting the pH of the food to which the gelling composition has been added, as well as controlling the gelation reaction of the water-soluble polymer (i.e., it works as a reaction retardant). Specific examples of the pH regulator and/or gelation retardant that can advantageously be used include, but are not limited to, trisodium citrate, sodium hexametaphosphate and tetrasodium pyrophosphate.

The gelling composition of the present invention may further comprise a thickener other than the water-soluble polymer capable of forming a thermo-irreversible gel.

Specific examples of the thickener include, but are not limited to, xanthan gum, guar gum, gellan gum, locust bean gum, tamarind gum, glucomannan, carrageenan, agar, pectin, alginic acids, succinoglycan and psyllium seed gum.

In one embodiment of the present invention, 5-50 mass % of deacylated gellan gum, 2.5-25 mass % of calcium salt (e.g., calcium lactate), 10-90 mass % of dispersant (e.g., dextrin) and 1-10 mass % of pH regulator and/or retardant (e.g., trisodium citrate) may be incorporated in the gelling composition. In addition, 0.5-5 mass % of a thickener (e.g., xanthan gum) may also be incorporated.

After incorporating the respective components in appropriate amounts, the gelling composition of the present invention may be portion-packaged and supplied.

Further, the present invention provides a method of gelling a food and enhancing the shape-retaining property of the food against reheating, wherein the method comprises allowing the food to contain the above-described gelling composition.

Still further, the present invention provides a method of preparing a gelatinous food which retains its original shape even when reheated, wherein the method comprises allowing the food to contain the above-described gelling composition.

The amount of addition of the gelling composition of the present invention may be 0.5-10 g per 100 g of food.

To prepare a gelatinous food by the method of the present invention, the amount of addition of the gelling composition may be so adjusted as to provide the following physical properties: mean hardness stress 300-20,000 N/m$^2$; mean cohesiveness 0.2-0.9; mean adhesion energy 100-1500 J/m$^3$. These physical data are in conformity with the Criteria for Permission of Food for Special Dietary Uses (for People having Difficulty in Swallowing).

With the gelling composition of the present invention, it is possible to prepare a gelatinous food which retains its original shape even when reheated. Since the gelling composition of the present invention enables the preparation of a gelatinous food capable of retaining its original shape even after reheating treatment in accordance with the Hygienic Control Manual for Large-Scale Cooking Facilities, the gelling composition of the present invention is suitable for preparing gelatinous dysphagia diets to be served at hospitals or nursing facilities to elderly or diseased individuals with reduced chewing function (i.e., individuals having difficulty in swallowing).

EXAMPLES

Hereinbelow, the present invention will be described in detail with reference to the following Examples. However, the present invention is not limited to these Examples.

Example 1 Preparation of a Gelling Composition (Invention Product)

Dextrin (79 kg), deacylated gellan gum (10 kg) and xanthan gum (3 kg) were blended and then subjected to granulation while spraying a binder solution (30 kg of water having 2 kg of calcium lactate, 2 kg of trisodium citrate, 2 kg of locust bean gum, 1 kg of calcium sulfate and 1 kg of sodium chloride dissolved therein). The granules were sieved to collect particles of 250-710 μm in size (diameter) (95-100 kg).

Comparative Example 1 Preparation of a Gelling Composition (Comparative Product)

Dextrin (40 kg), xanthan gum (30 kg), locust bean gum (10 kg) and agar (10 kg) were blended and then subjected to granulation while spraying a binder solution (30 kg of water having 10 kg of dextrin dissolved therein). The granules were sieved to collect particles of 250-710 μm in size (diameter) (95-100 kg).

Figure 2:
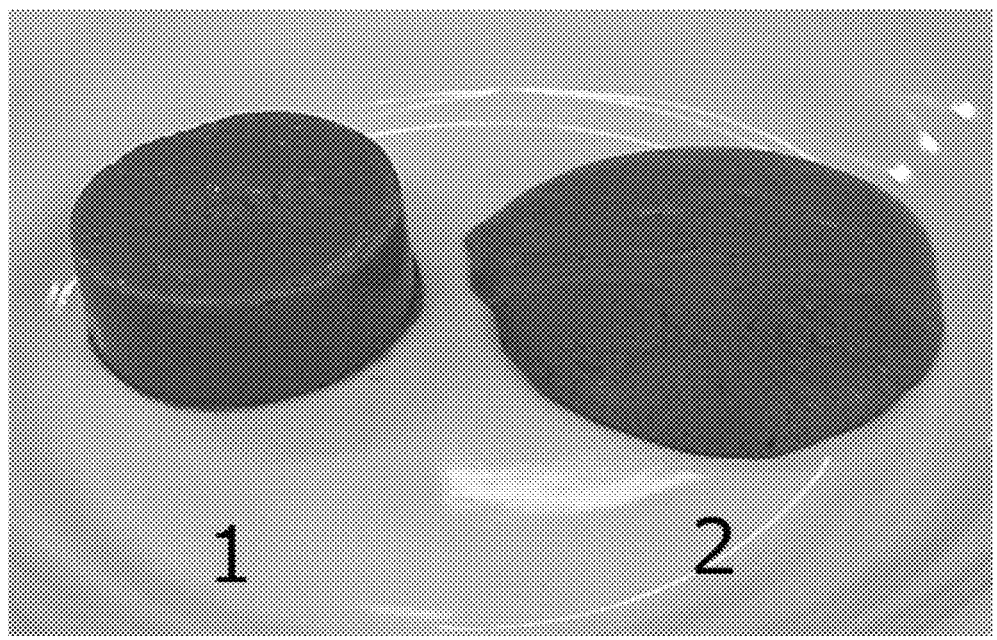
FIG. 2. The states of foods after reheating are shown (1: food using the gelling composition prepared in Example 1; and 2: food using the gelling composition prepared in Comparative Example 1).

Example 2 Preparation of a Gelatinous Food (1) Preparation of a Gelatinous Food Using the Gelling Composition as Product of the Present Invention
(1-1) The gelling composition prepared in Example 1 (40 g) was dispersed in 1000 g of soup stock or 1000 g of water.
(1-2) The dispersion obtained in (1-1) was added to 1000 g of mackerel boiled in soy sauce, then charged into a mixer.
(1-3) The resultant mixture was heated to 85° C. or more while stirring.
(1-4) The hot mixture was poured into molds before getting cold, chilled rapidly, and allowed set by cooling in a refrigerator.
(1-5) When set, the food product thus prepared was cut into pieces of an appropriate size and put on a plate (FIG. 1-1).
(1-6) The gelatinous food was reheated in a reheating cart for New Cook-Chill system (with the temperature at the center of the gelatinous food being held at 75° C. or more for one minute or longer).
(1-7) Even after the reheating, the gelatinous food could be served while retaining its original shape (FIG. 2-1).
(2) Preparation of a Gelatinous Food Using the Gelling Composition (Comparative Product)
(2-1) The gelling composition prepared in Comparative Example 1 (40 g) was added to 1000 g of mackerel boiled in soy sauce and 1000 g of soup stock and then charged into a mixer.
(2-2) The resultant mixture was heated to 85° C. or more while stirring.
(2-3) The hot mixture was poured into molds before getting cold, let to cool down, and then allowed to set by cooling in a refrigerator.
(2-4) When set, the food product thus prepared was cut into pieces of an appropriate size and put on a plate (FIG. 1-2).
(2-5) The gelatinous food was reheated in a reheating cart for New Cook-Chill system (with the temperature at the center of the gelatinous food being retained at 75° C. or more for one minute or longer).
(2-6) After the reheating, the gelatinous food was unable tot retain its original shape (FIG. 2-2).

Example 3 Physical Properties of the Gelatinous Food

Figure 3:
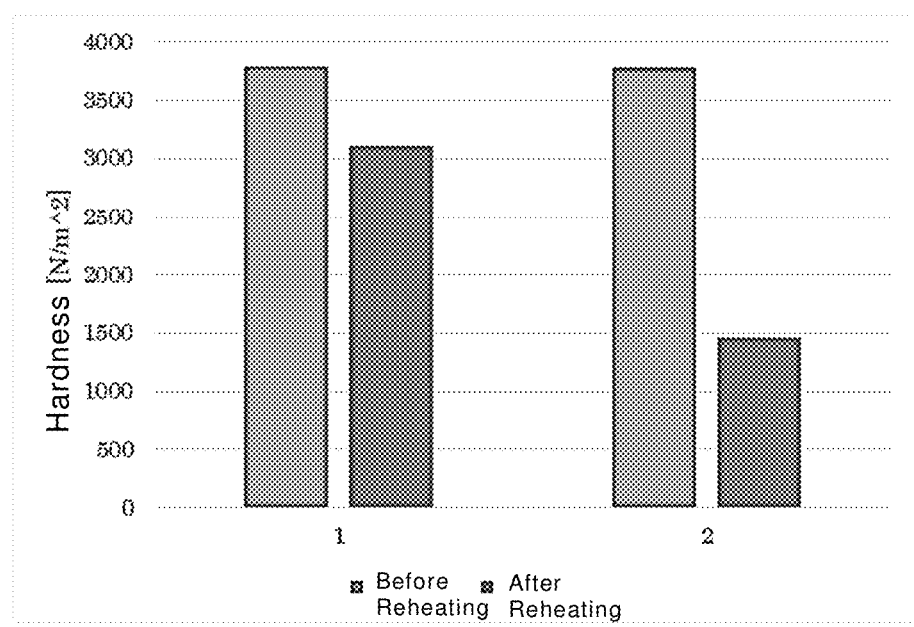
FIG. 3. The hardnesses of foods before and after reheating are shown (1: food using the gelling composition prepared in Example 1; and 2: food using the gelling composition prepared in Comparative Example 1).

The hardness of the gelatinous food prepared in Example 2 was compared before and after reheating (at a center temperature of 75° C. for 3 minutes). The measurement was carried out by a method based on the Criteria for Permission of Food for Special Dietary Uses (for People having Difficulty in Swallowing).
Measurement temperature: 45° C.
Measuring instrument: Yamaden Texturometer (Rheoner RE-3305S)
Plunger: No. 56 (φ20 mm)
Compression velocity: 10 mm/s
Measurement distortion rate: 66.67%
PRISET. No. 1: 15.00 mm
PRISET. No. 2: 2 TIMES
The results are shown in FIG. 3.
The mean hardness stress of the gelatinous food prepared in Example 2 was measured before and after reheating (n=5). "1" in the bar graph represents the mean hardness stress of the gelatinous food using the gelling composition as the invention product; and "2" in the bar graph represents the mean hardness stress of the gelatinous food using the gelling composition as the comparative product. From FIG. 3, it was confirmed that the gelatinous food using the gelling composition as the invention product experienced only a small change in mean hardness stress before and after reheating.

Example 4 Preparation of the Gelling Composition (Invention Product)

Dextrin (49 kg), sodium alginate (30 kg) and xanthan gum (5 kg) were blended and then subjected to granulation while spraying a binder solution (30 kg of water having 3 kg of calcium lactate, 4 kg of trisodium citrate, 2 kg of locust beam gum, 6 kg of calcium sulfate and 1 kg of sodium chloride dissolved therein). The granules were sieved to collect particles of 250-710 μm in size (diameter) (95-100 kg).

Figure 4:
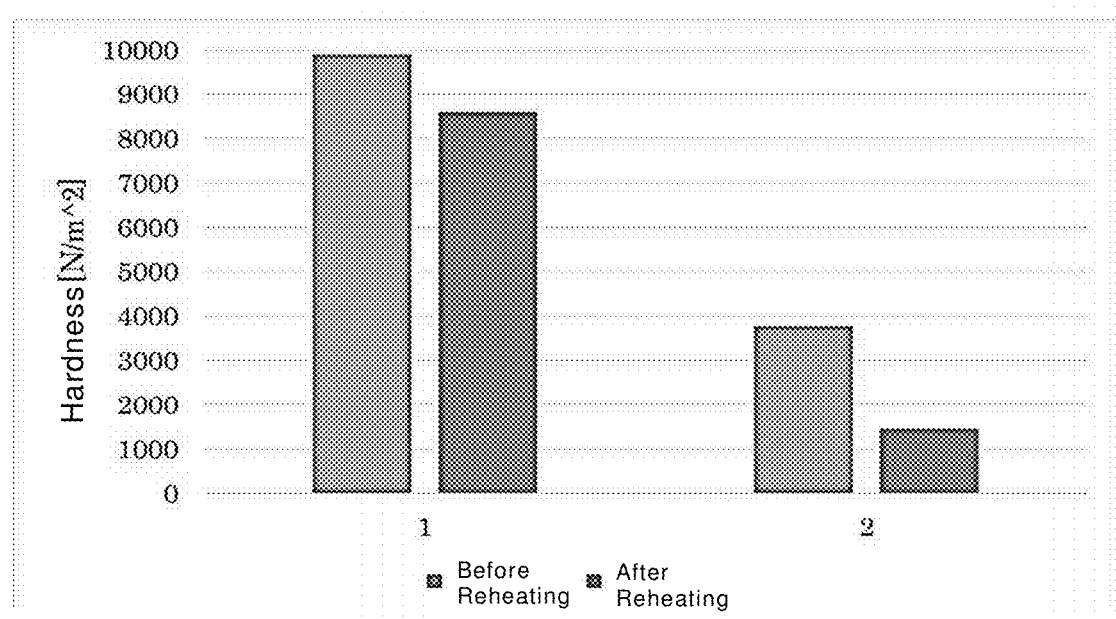
FIG. 4. The hardnesses of foods before and after reheating are shown (1: food using the gelling composition prepared in Example 4; and 2: food using the gelling composition prepared in Comparative Example 1).

A gelatinous food was prepared in the same manner as described in Example 2, and the physical properties of the gelatinous food were measured in the same manner as described in Example 3.
The results are shown in FIG. 4.
The mean hardness stress of the gelatinous food (invention product) using the gelling composition prepared in this Example was measured before and after reheating (n=5). "1" in the bar graph represents the mean hardness stress of the gelatinous food using the gelling composition as the invention product; and "2" in the bar graph represents the mean hardness stress of the gelatinous food using the gelling composition as the comparative product (i.e., gelatinous food using the gelling composition prepared in Comparative Example 1). From FIG. 4, it was confirmed that the gelatinous food using the gelling composition as the invention product experienced only a small change in mean hardness stress before and after reheating.

All publications, patents and patent applications cited herein are incorporated herein by reference in their entirety.

INDUSTRIAL APPLICABILITY

The present invention is applicable to preparation of gelatinous foods which do not dissolve even when reheated (e.g., dysphagia diets).

The invention claimed is:

1. A gelatinous food comprising a gelling composition and food, wherein
the gelling composition comprises:
(i) deacylated gellan gum,
the gelatinous food retains its original shape even when reheated,
the gelling composition is added to the food in an amount of 0.5-10 g per 100 g of food,
the gelatinous food excludes pectin, and
the gelatinous food has mean hardness stress 300-20,000 N/m$^2$.

2. The gelatinous food of claim 1, wherein the reheating is carried out with the temperature at the center of the food being held at 75° C. or more for a heating period of one minute or longer, or under conditions equivalent thereto or more severe.

3. The gelatinous food of claim 1, which further comprises a dispersant.

4. The gelatinous food of claim 3, wherein the dispersant is dextrin.

5. The gelatinous food of claim 1, which further comprises a pH regulator and/or a gelation retardant.

6. The gelatinous food of claim 5, wherein the pH regulator and/or the gelation retardant is trisodium citrate.

7. The gelatinous food of claim 1, wherein the gelatinous food has mean cohesiveness 0.2-0.9 and mean adhesion energy 100-1500 J/m$^3$.

8. The gelatinous food of claim 1, wherein the deacylated gellan gum is a polysaccharide produced extracellularly by a microorganism *Sphingomonas elodea* occurring in waterweeds.

9. The gelatinous food of claim 1, further comprising a calcium salt selected from the group consisting of calcium sulfate, calcium chloride, calcium acetate, calcium lactate, calcium gluconate, calcium primary phosphate, calcium secondary phosphate, calcium tertiary phosphate, calcium malate, calcium hydroxide, calcium citrate, and calcium carbonate.

10. The gelatinous food of claim 9, wherein the calcium salt comprises calcium lactate.

11. The gelatinous food of claim 1, further comprising a thickener other than the water-soluble polymer capable of forming a thermo-irreversible gel.

12. The gelatinous food of claim 11, wherein the thickener comprises one selected from the group consisting of xanthan gum, guar gum, gellan gum, locust bean gum, tamarind gum, glucomannan, carrageenan, agar, pectin, alginic acids, succinoglycan and *psyllium* seed gum.

13. The gelatinous food of claim 1, wherein the gelatinous food is prepared by adding the gelling composition to the food.

14. The gelatinous food of claim 1, wherein the gelatinous food is for an individual with reduced chewing function or difficulty in swallowing.

15. The gelatinous food of claim 1, wherein only gellan gum included in the gelling composition is the deacylated gellan gum.

16. A gelling composition for preparing a gelatinous food, wherein the gelling composition consists essentially of:
dextrin,
deacylated gellan gum
xanthan gum,
at least one calcium or sodium salt selected from the group consisting of calcium lactate, trisodium citrate, locus bean gum, calcium sulfate and sodium chloride, and
a pH regulator or gelation retardant selected from the group consisting of trisodium citrate, sodium hexametaphosphoate and tetrasodium pyrophosophate,
wherein the gelling composition excludes pectin,
the gelling composition is added to the food in an amount of 0.5-10 g per 100 g of food, and
the gelatinous food has mean hardness stress 300-20,000 N/m$^2$.

17. A method of preparing gelling a food and enhancing the shape-retaining property of the food against reheating, comprising adding to the food a gelling composition of claim 16.

18. The method of claim 17, wherein the gelling composition is added to the food in an amount of 0.5-10 g per 100 g of food.

19. A method of preparing a gelatinous food which retains its original shape even when reheated, comprising adding to the food to contain the gelling composition of claim 16.

20. The gelling composition of claim 16, the gelling composition comprises 5-50 mass % of the deacylated gellan gum.

21. The gelling composition of claim 16, wherein the gelatinous food is for an individual with reduced chewing function or difficulty in swallowing.

22. A gelling composition for preparing a gelatinous food, wherein the gelling composition consists essentially of:
dextrin,
deacylated gellan gum and alginic acid or salt thereof,
xanthan gum,
at least one calcium or sodium salt selected from the group consisting of calcium lactate, trisodium citrate, locus bean gum, calcium sulfate and sodium chloride, and
a pH regulator or gelation retardant selected from the group consisting of trisodium citrate, sodium hexametaphosphoate and tetrasodium pyrophosophate,
wherein the gelling composition excludes pectin,
the gelling composition is added to the food in an amount of 0.5-10 g per 100 g of food, and
the gelatinous food has mean hardness stress 300-20,000 N/m$^2$.

23. The gelling composition of claim 22, wherein said alginic acid or salt thereof forming a thermo-irreversible gel sodium alginate.

* * * * *